United States Patent
Mori et al.

[15] 3,678,826
[45] July 25, 1972

[54] SYSTEM FOR CONTROLLING A CAMERA SHUTTER

[72] Inventors: Chiharu Mori, Tokyo; Katsumi Ota, Fukuoka, both of Japan

[73] Assignee: Asahi Kogaku Kogyo Kabushiki Kaisha, Tokyo-to, Japan

[22] Filed: June 10, 1971

[21] Appl. No.: 151,647

[30] Foreign Application Priority Data

June 16, 1970 Japan..................................45/52140

[52] U.S. Cl..........................................................95/10 CT
[51] Int. Cl..........................................................G03b 7/08
[58] Field of Search..................95/10 CT, 10 CD; 250/214 P

[56] References Cited

UNITED STATES PATENTS

| | | | |
|---|---|---|---|
| 3,458,770 | 7/1969 | Denger | 95/10 UX |
| 3,602,717 | 8/1971 | Konig | 95/10 X |

Primary Examiner—Samuel S. Matthews
Assistant Examiner—Michael L. Gellner
Attorney—Steinberg & Blake

[57] ABSTRACT

A system for controlling a shutter of a single lens reflex camera of the type which measures light which has first passed through the camera objective. A photosensitive unit which has a constant current characteristic is provided for measuring light from the object which has passed through the objective. The photoelectric current of this unit provides for a control transistor a collector current which is substantially equal to the photoelectric current, so that the control transistor will have a base-emitter voltage corresponding to the collector current and thus to the intensity of the light received by the photosensitive unit. This base-emitter voltage is then used in the subsequent determination of an exposure. A holding circuit is provided for maintaining the base-emitter voltage of the control transistor, and an amplifier is electrically connected with the holding circuit and forms with the latter and with the transistor and photosensitive unit a closed loop automatic control circuit.

8 Claims, 4 Drawing Figures

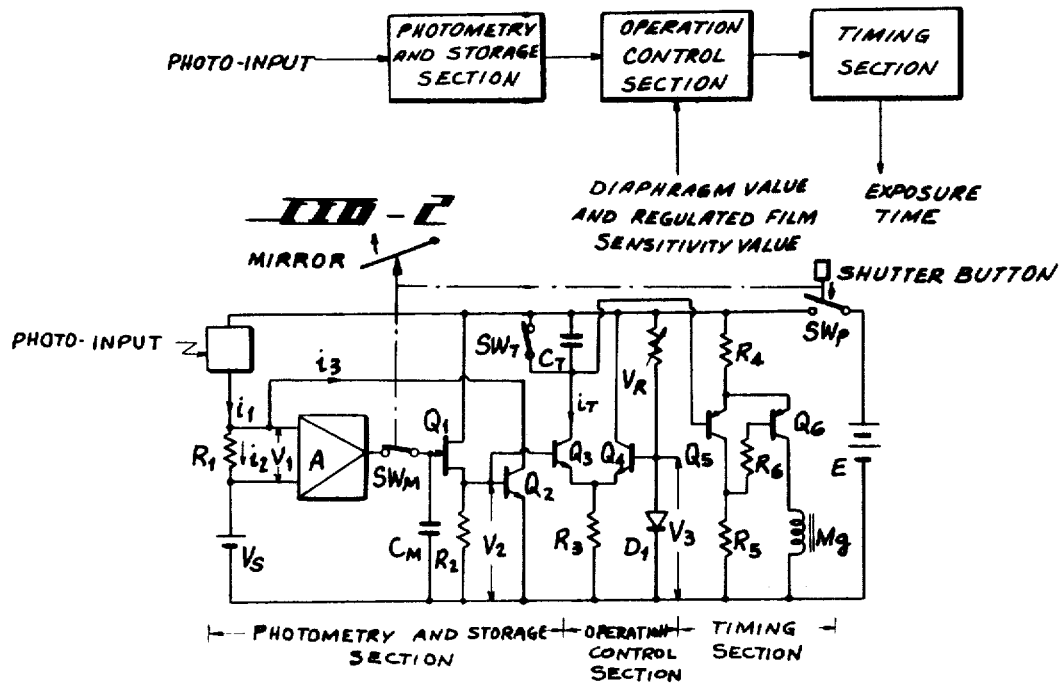
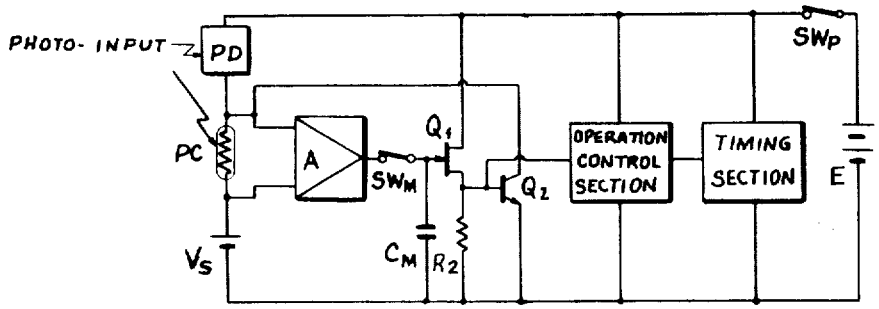
INVENTORS
CHIHARU MORI
KATSUMI OTA
BY
Steinberg and Blake
ATTORNEYS

SYSTEM FOR CONTROLLING A CAMERA SHUTTER

BACKGROUND OF THE INVENTION

The present invention relates to cameras.

More particularly, the present invention relates to single-lens reflex cameras of the through-the-lens (TTL) type wherein light from the object is measured only after the light has first passed through the camera objective.

As is well known, in accordance with the light received from the object as well as in accordance with additional factors such as the selected diaphragm setting and the film speed, it is possible to determine automatically the exposure time by automatic control of the camera shutter.

There has already been proposed for the control of a camera shutter in an arrangement of the above general type a system where a photocell, a logarithmic compression element, and an amplifier form a light-measuring or photometric section of a system in which this section is combined in a mutually differential manner with a section of the system into which the factors of diaphragm setting and film speed are introduced through a suitable variable resistor with this latter section including a logarithmic compression element and an amplifier, and the gains of the amplifiers of both of these sections are set so that characteristic of each section will conform to the required photographic operations, each of the sections operating automatically with a linear voltage with these operations having their outputs stored by a capacitor. With this known system a timing capacitor is charged with a constant current proportional to the input to the photocell through a circuit of high input resistance serving for logarithmic expansion and constant current charging, so that the instant when this constant current charging starts coincides with the instant when the leading curtain of the camera shutter is released for opening the shutter. The instant when the trailing curtain of the shutter is released to follow the leading curtain so as to terminate the exposure is regulated by including in the system a switching circuit such as a Schmitt circuit, so that in this way the exposure time can be obtained.

It has also been proposed to provide an arrangement wherein the photocell which measures the light is combined with a transistor through an amplifier to establish a closed loop automatic control circuit where an electric current which is inversely proportional to the inner resistance of the photocell, which depends upon the light input from the object to be photographed, is obtained and stored for a predetermined interval. The values of this electric current and another electric current determined by the selected diaphragm setting and film speed are logarithmically compressed, respectively, with the result of this logarithmic compression then being subjected to the photographic operations and followed by a logarithmic expansion in a differentially operating circuit having a linear voltage input and an output constant current for charging a capacitor. The length of time required for the terminal voltage of this capacitor to attain a predetermined level is then utilized to determine the exposure time.

Known systems of the above general types suffer from several drawbacks among which are is the fact that the photocell used is a cadmium sulfide photocell having a relatively slow response characteristic. These known photocells create particular problems when the intensity of the light coming from the object to be photographed is relatively low, since under these conditions in particular a relatively long time is required for the inner resistance value of the photocell to become stabilized. In addition the values determined from light-measurement with such a photocell are undesirably influenced by the memory or historical effect of such units according to which they do not readily change from their previous states, and in addition such photosensitive structures are highly sensitive to temperature fluctuations, so that all these factors contribute to the prevention of achievement of the desired accuracy in the light measurement.

SUMMARY OF THE INVENTION

It is accordingly a primary object of the present invention to provide a shutter control system which will avoid the above drawbacks.

In particular, it is an object of the present invention to provide a system combining a closed loop automatic control circuit utilizing a photosensitive means having a constant current characteristic in a photometry or light-measuring and storage section, even though the use of such units has previously created various problems with greater frequency than the remainder of the control circuit for the shutter.

In particular it is an object of the present invention to employ a structure of this latter type in combination with a differential circuit of a balanced type to achieve a highly effective combination of these structures to improve very greatly the stability and usefulness of the circuitry.

It is especially an object of the present invention to provide for a camera shutter control system circuitry capable of delivering to a control transistor as the collector current thereof a substantially constant current which substantially equals the photoelectric current of the photosensitive unit which measures the light, so that the base-emitter voltage of the control transistor can then be combined with the factors of film speed and diaphragm setting to achieve a highly accurate exposure time.

According to the invention the shutter-controlling system includes a photosensitive means for receiving light which has passed through the objective of the camera, this photosensitive means having a constant current characteristic and being electrically connected with a transistor means which receives from the photosensitive means a collector current substantially equal to the photoelectric current of the photosensitive means determined by the light received from the object which is to be photographed. The base-emitter voltage of this transistor means will thus correspond to the collector current thereof, and a holding circuit means is connected electrically with the transistor means for holding the base-emitter voltage thereof so that the latter can be used in the subsequent determination of the exposure. An amplifier means is electrically connected with the holding circuit means, and the photosensitive means and transistor means form a closed loop automatic control circuit through the amplifier means and holding circuit means.

BRIEF DESCRIPTION OF DRAWINGS

The invention is illustrated by way of example in the accompanying drawings which form part of this application and in which:

FIG. 1 is a block diagram of the system used according to the invention;

FIG. 2 is a wiring diagram showing details of the system;

FIG. 3 is a diagramatic representation of the details of the photosensitive means; and FIG. 4 is a wiring diagram of another embodiment of a circuit according to the invention.

DESCRIPTION OF PREFERRED EMBODIMENTS

Referring first to the block diagram of FIG. 1, the light from the object which is to be photographed forms the indicated photo-input received by the photometry and storage section in which the light input is measured and in which there is obtained a voltage which is stored for a given interval so as to be available for subsequent use in the determination of the exposure. The output from this photometry and storage section forms the input to an operation control section which receives not only the output from the photometry and storage section but also an input according to the selected diaphragm setting and the speed of the film which is used in the camera. The output from the operation control section is then used as the input to the timing section which automatically determines the exposure time.

The details of the sections indicated in FIG. 1 are illustrated in FIG. 2. The photo-input is received, passing through the objective of the camera, by a photosensitive means PD in the form of a photosensitive element having a PN junction such as a photodiode with a transistor, as described below in connection with FIG. 3. In general, the photosensitive means PD will achieve through an amplifier an electrical current which is substantially equal to the photoelectric current of the photosensitive means, depending upon the photo-input from the object to be photographed, and this electrical current is maintained for a predetermined duration. The value of this electrical current and the value of another electrical current determined in accordance with the diaphragm setting and film speed are both logarithmically compressed, respectively, and the result of this logarithmic compression operation is subjected to a photographic operation with a following logarithmic expansion in a differentially operating circuit portion having an input in the form of a linear voltage and an output current which serves as a constant current charge for a capacitor, so that the time required for a terminal voltage of this capacitor to attain a predetermined value may be utilized for controlling the exposure time.

Referring now to FIG. 2, the photometry and storage section shown at the left forms one of the most important parts of the present invention. In this section of the system an electrical current which is substantially equal to the photoelectric current of the photosensitive means PD, depending upon the photo-input of the light travelling through the objective from the object to be photographed, is generated under the influence of a closed loop automatic control, and this current is logarithmically compressed to form an output voltage which is maintained for a required interval. The photosensitive means PD is connected in series with an error-detecting resistance means $R_1$ which in turn is connected in series with a bias voltage or power source $V_s$, the photosensitive means PD having a constant current characteristic. A control transistor means $Q_2$ is connected in series with the photosensitive means PD through a storage part of the section, the storage circuitry including the amplifier means A of a high input resistance type utilizing the terminal voltage $V_1$ of the error-detecting resistance means $R_1$ as its input signal. A switch means $SW_M$ for bringing about a storing operation (referred to below as a "memory switch") serves to releasably connect to the amplifier means A a holding circuit means formed by a storage capacitor $C_M$, a field effect transistor $Q_1$ and a resistor $R_2$. A battery E serves as the power source for the entire circuitry. All of these components form together a closed loop automatic control circuit.

During operation a photoelectric current $i_1$ which is substantially proportional to the photo-input travelling through the objective from the object to be photographed passes through the photosensitive means PD, and this photoelectric current $i_1$ is divided into a current component $i_2$ which travels through the error-detecting resistance means $R_1$ and into a second current component $i_3$ which passes through the control transistor means $Q_2$, assuming that the amplifier means A of the high input resistance type has an input resistance sufficiently high relative to the error-detecting resistance of the resistor means $R_1$. The closed loop automatic control circuit is arranged in such a way that the relationship $R_1 i_2 = V_1 \approx 0$ is always maintained over the entire range of the photo-input, with the value $R_1$ indicating the resistance value of the error-detecting resistor means $R_1$. With this latter operation the collector current $i_3$ of the control transistor means $Q_2$ is maintained substantially equal to the photoelectric current $i_1$.

With the collector current $i_3$ of the control transistor means $Q_2$ thus being achieved so that it is substantially equal to the photoelectric current $i_1$, the voltage $V_2$ between the base and emitter of the control transistor means $Q_2$ is maintained constant independently of variations in the photoelectric current $i_1$ due to the fact that at this time the mirror behind the objective in the camera snaps up to permit the film to be exposed, and the storage capacitor $C_M$ and the field effect transistor $Q_1$ which form the holding circuit means will now operate to maintain this base-emitter voltage $V_2$ constant. This base-emitter voltage $V_2$ of the control transistor means $Q_2$ is used as the output voltage of the photometry and storage section. Thus, this output voltage $V_2$ provides a linear variation relative to the variation of the photo-input from the object which is to be photographed in the form of an exponential function.

The operation control section of the system of the invention functions to provide the charging current for timing purposes, in response to the operations according to which the photo-input from the object to be photographed, the diaphragm setting, and the film speed values are all used as variables with linear voltage. This operation control section operates in the following manner.

The terminal voltage $V_3$ of a logarithmic compression element formed by the diode $D_1$ is connected in series with a variable resistor $V_R$ which is set according to the selected diaphragm aperture and film speed. The output voltage $V_2$ from the photometry and storage section and the terminal voltage $V_3$ are used, respectively, as input voltages for a differentially operating circuit of the emitter junction type made up of transistors $Q_3$, $Q_4$ and a resistor $R_3$, so that the collector current of the transistor $Q_3$ varies in the form of an exponential function relative to a linear variation of the input voltage. Accordingly, the characteristics of the photosensitive means and the variable resistance $V_R$ set according to the diaphragm aperture and film speed values, in addition to the circuit constant, are all selected in such a way that the relationship between the photo-input from the object to be photographed, the selected diaphragm setting, the film speed, and the exposure time will have a given peak value or apex indication to obtain a charging current for timing purposes in a well known manner, formed by the output current $i_T$ of the operation control section.

The output current $i_T$, the electrostatic capacity of a timing capacitor $C_T$, and the transfer level of a Schmitt circuit made up of transistors $Q_5$, $Q_6$, and resistors $R_4$, $R_5$, $R_6$, and an electromagnet $M_g$ are all selected so that they will have a relationship obtaining from these values a given apex indication serving to provide an exposure time which corresponds to the duration of time from the instant when a timing switch $SW_T$ is moved from its closed to its open position to the instant when the Schmitt circuit transfers or responds to the trigger value as a result of the constant-current charging of the timing capacitor $C_T$ with the output current $i_T$ as the charging current for bringing about timing of the exposure from the instant when the switch $SW_T$ is displaced from its closed to its open position.

The operation of the above system of the invention together with components of the camera will now be described. As is diagrammatically represented at the upper right portion of FIG. 2, in order to make an exposure a shutter button of the camera will be depressed. This depression of the shutter button will first serve during the initial part of the movement of the button to close the normally open power switch $SW_P$, so that the entire circuit receives power from the battery E. During the continued depression of the shutter button, before actual release of the leading curtain of the shutter, the reflecting mirror behind the objective is snapped up to the exposure position where light can travel from the objective to the film, and this mirror is diagrammatically represented also in FIG. 2. However, just before the mirror snaps up, so as to terminate the travel of light to the photosensitive means PD, the continued depression of the shutter button brings about in a known way opening of the memory switch $SW_M$ so that it is moved from its normally closed to its open position by actuation of the shutter button just prior to snapping up the mirror, as is diagrammatically represented in FIG. 2. Thus, just prior to actual exposure the information detected by the photo-input to the photosensitive means PD forms the base-emitter voltage $V_2$ of the control transistor means $Q_2$, and the holding circuit means will maintain this base-emitter voltage $V_2$ for the required interval independently of variations in the photoelectric current passing through the photosensitive means PD as a result of a variation in the photo-input value resulting from displacement of the mirror. The holding circuit means formed by the capacitor $C_M$ and the field effect transistor $Q_1$ provides the desired holding of the base-emitter voltage $V_2$ for the interval required for operation of the shutter.

Immediately subsequent to these operations, the shutter button will reach the end of its travel so as to release the leading curtain in order to open the shutter and start the exposure, and simultanesouly with this operation the timing switch $SW_T$ is displaced from its normally closed to its open position, in a known manner which assures synchronism of opening of the switch $SW_T$ with the release of the leading curtain of the focal plane shutter so that it will open the shutter and start the exposure, these operations taking place in cooperation with the rising mirror so that the timing capacitor $C_T$ will now be charged with the constant current provided by the charging current $i_T$ for timing purposes determined in accordance with the preselected diaphragm setting, the film speed, and the photo-input value. After an interval corresponding to the time determined by these operations has elapsed, the Schmitt circuit will respond so that the electromagnet $M_g$ will release the trailing curtain of the focal plane shutter to follow the leading curtain and terminate the exposure by closing the shutter. When the running of the trailing curtain has been completed, the mirror will in a known way return into its position in the path of light travelling through the objective, and all of the remainder of the structure will be restored to their initial states. Thus an exposure has been completed and the camera is made ready for the next exposure by transportation of the next unexposed film frame into the exposure position.

It is preferred to use with the structure of the invention a photosensitive means of high sensitivity as indicated in FIG. 3. Thus, as may be seen from FIG. 3, the photo-input is received by a photodiode connected between the collector and base of a transistor so as to be inversely biased and in this way the photoelectric current of the photosensitive means shown in FIG. 3 is easily amplified in a stable manner, as is in itself well known. The use of such a composite type of photosensitive means in the circuitry of the present invention is highly effective for practical purposes since this photosensitive means of the composite type has a constant current characteristic.

Another embodiment of the invention is illustrated in FIG. 4. According to this embodiment the error-detecting resistor means $R_1$ of FIG. 2 is replaced by a photosensitive element such as a cadmium sulfide element which has an inner resistance which varies according to the photo-input from the object to be photographed. Thus with this embodiment the light will also be received by the cadmium-sulfide element PC which forms the error-detecting resistance means of this embodiment.

With the photometry and storage section of FIG. 2, the control ratio $i_3/i_1$ varies in proportion to the photo-input from the object to be photographed, and the gain of the amplifier means A is set in accordance with the minimum value of the photo-input in order to obtain the desired control ratio over the entire range of the photo-input. Accordingly an amplifier of high gain is provided. On the other hand, by utilizing a photocell which has an inner resistance which varies in accordance with the photo-input, as illustrated in FIG. 4, it is possible to reduce the variation in the control ratio very readily. Particularly where the photocell has a variable resistance which is inversely proportional to the photo-input, it is possible to provide a substantially constant control ratio, when such a photocell is used for the error-detecting resistance means.

Although the stability of the control ratio depends upon the unstable photo-resistance characteristic of the photocell relative to the ambient conditions, this latter factor does not provide any substantial influence on the stability of the shutter-control circuitry of the invention inasmuch as the gain of the amplifier means A has a substantial margin. Therefore, by using a circuit arrangement as shown in FIG. 4 for the photometry and storage section, in particular, by using a cadmium sulfide resistor PC for the error-detecting resistance means, the desired control ratio is very readily obtained by way of a simple circuitry over the entire range of photo-input from the object which is to be photographed.

It is apparent from the above description that with the structure of the invention all of the disadvantages previously encountered when using a photocell such as a cadmium sulfide photocell for the photosensitive means are avoided. The photometry and storage section which in the past has created various problems forms with the invention a closed loop automatic control circuit and the operation control section has a balanced type of circuitry, providing in this way an electric shutter control circuit which is extremely low with respect to sensitivity to temperature fluctuations and fluctuations in the voltage of the source, and at the same time has an extremely high stability, operates with a very high accuracy, and has an assured long life of reliable operation.

What is claimed is:

1. In a system for the automatic electrical control of the shutter of a single-lens reflex camera of the type which measures light which has first passed through the objective of the camera, photosensitive means for receiving light which has passed through the objective from the object to be photographed and for providing a photoelectric current according to the light received from the object, said photosensitive means having a constant current characteristic, transistor means electrically connected with said photosensitive means for receiving therefrom a collector current substantially equal to said photoelectric current, said transistor means having a base-emitter voltage corresponding to said collector current and serving as part of an input to further circuitry for determining the operation of the camera shutter, holding circuit means electrically connected with said transistor means for holding said base-emitter voltage thereof and amplifier means electrically connected between said photosensitive means and said holding circuit means and forming with said photosensitive means, transistor means, and holding circuit means at least part of a closed loop automatic control circuit.

2. The combination of claim 1 and wherein an error-detecting resistance means and bias voltage source therefor are connected in series with each other and with said photosensitive means, so that part of the photoelectric current flows through said error-detecting resistance means while the remainder of said photoelectric current is received by said transistor means as the collector current thereof, and said error-detecting resistance means together with the part of the photoelectric current flowing therethrough forming for said amplifier means an input which is approximately equal to zero.

3. The combination of claim 2 and wherein said error-detecting resistance means is part of said closed loop automatic control circuit and is in the form of a cadmium sulfide photocell.

4. The combination of claim 2 and wherein said amplifier means is a high gain amplifier.

5. The combination of claim 1 and wherein said holding circuit means includes a storage capacitor and field effect transistor connected electrically with said transistor means, and switch means for connecting said holding circuit means to said amplifier means only during an initial light-measuring part of an exposure cycle, and for then disconnecting said holding circuit means from said amplifier means so that said holding circuit means will then maintain said base-emitter voltage of said transistor means.

6. The combination of claim 5 and wherein the camera has a mirror which reflects light to the photosensitive means only during an initial light-measuring part of an exposure operation while said mirror moves out of the path of light passing through the objective just prior to opening of the camera shutter to make an exposure, and shutter-operating means operatively connected with said switch means for displacing the latter to an open position disconnecting said holding circuit means from said amplifier means just prior to swinging of said mirror to a position preventing light from reaching said photosensitive means.

7. The combination of claim 1 and wherein said photosensitive means is in the form of a photodiode and a transistor connected thereto.

8. The combination of claim 7 and wherein said photodiode is connected between the collector and base of said transistor of said photosensitive means so as to be inversely biased thereby.

* * * * *